P. C. TRAVER.
ANTISKIDDING DEVICE COUPLING.
APPLICATION FILED SEPT. 11, 1909.
969,426.
Patented Sept. 6, 1910.
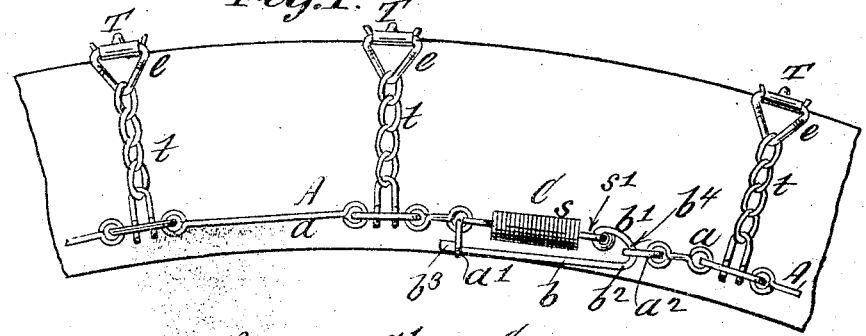
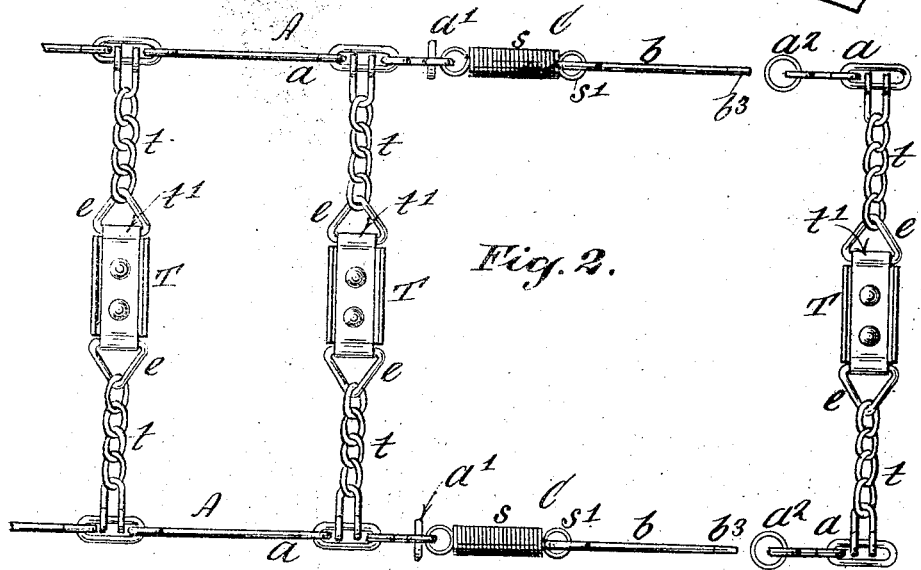
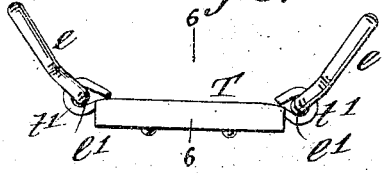
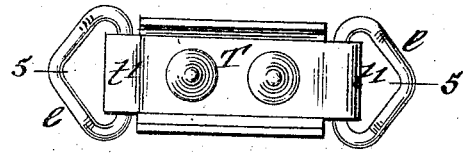
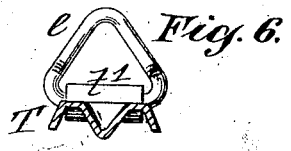
Witnesses:
D. W. Gardner
A. E. Lauckof
Inventor:
Philip C. Traver
By his Attorney
Geo. Willett

UNITED STATES PATENT OFFICE.

PHILIP C. TRAVER, OF FAR ROCKAWAY, NEW YORK, ASSIGNOR, BY DIRECT AND MESNE ASSIGNMENTS, TO PEARSALL-TRAVER MANUFACTURING COMPANY, A CORPORATION OF NEW YORK.

ANTISKIDDING-DEVICE COUPLING.

969,426.  Specification of Letters Patent.  Patented Sept. 6, 1910.

Application filed September 11, 1909. Serial No. 517,301.

*To all whom it may concern:*

Be it known that I, PHILIP C. TRAVER, a citizen of the United States, residing at Far Rockaway, Queens county, and State of New York, have invented certain new and useful Improvements in Antiskidding-Device Couplers, of which the following is a specification.

My improvements relate to coupling devices for anti-skidding devices for use on wheel tires generally, especially those used on the wheels of automobiles; and the invention consists in the construction and arrangement of parts hereinafter described and claimed specifically whereby the circumferential anchor chains are each provided with a form of coupling by which they may not only be quickly and conveniently secured in position on opposite sides of a tire, but couplings which also constitute resilient means for holding said anchor chains, and hence the whole anti-skidding device, taut upon the tire and also whereby the traction or gripping plates are rendered simple, cheap and effective in structure for the purpose designed.

In the accompanying drawings, the figure 1, is a side elevation of a portion of a pneumatic tire to which an anti-skidding device provided with my couplings is applied.

The circumferential anchor chains A, are formed of a series of articulated links $a$, of any suitable form and length, the ends of each anchor chain being united by the resilient coupling C. This coupling C, consists of a coiled retractile spring $s$, of piano or other suitable wire, of appropriate length and resilience, attached at one extremity to one end of the chain A, and having attached to its other extremity a return lever bolt $b$, of peculiar construction, the other end of which is adapted to engage with an eye $a'$, on the end of the chain A, to which the spring $s$, is attached. The lever bolt $b$, is formed with a loop $b'$, which engages with the loop or eye $s'$, of the spring $s$. From the loop $b'$, the lever is bent to form the return member $b^2$, formed at or near its extremity with the shoulder $b^3$, for engagement with the eye ring $a'$, before referred to. Between the return member $b^2$, and the loop $b'$, the lever bolt $b$, is formed with a bearing $b^4$, preferably out of alinement with the longitudinal axis of the spring $s$. This bearing $b^4$, is for engagement with the link, loop or eye ring $a^2$, on the other end of the anchor chain A, and its situation between the loop $b'$, and return member $b^2$, causes the tension of the spring $s$, in use, to tend to thrust the shouldered end of the lever outward so as to insure and preserve the engagement of the shoulder $b^3$, with the eye $a$. Hence the greater the strain on the spring and the greater the resilient force exerted thereby, the more securely the parts will be locked together. The retractile tendency of the spring is thus utilized in rendering the coupling positive whenever the length of the chain A, is such, as related to the circumference of the tire, that the elasticity of the spring is brought into play in driving the chain taut upon the tire.

The tread plates T, are attached to the circumferential anchor chains A, by ligatures $t$, $t$, preferably consisting of articulated chain links, substantially as shown, with links $e$ engaging in flanges $t'$ of the tread plates, although other flexible ligatures may be substituted if preferred.

The said couplings are not only simple and effective in use, but they provide means by which the anti-skidding device as a whole may be quickly and conveniently applied to or removed from a tire.

What I claim as my invention and desire to secure by Letters Patent is,

The combination of a chain and coupling, said coupling interposed between the two ends of said chain, said coupling comprising a coiled spring having one end attachable to one end of said chain, an outstanding connecting eye secured to said end of the chain, an eye on the opposite end of the spring, an eye on the opposite end of the chain, and a return lever bolt having one end pivotally connected with said eye of the spring and having a bight loosely engaged in the eye at the adjacent end of the chain, the free end of said return lever bolt extending parallel with the spring and beyond the opposite end thereof with its free end engageable in the connecting eye on
5 the end of the chain to which said spring is attached, the said spring and the bight of the return lever bolt being substantially in longitudinal alinement with the two ends of the chain.

PHILIP C. TRAVER.

Witnesses:
D. W. GARDNER,
GEO. WM. MIATT.